US007561103B2

(12) United States Patent
Lestarquit

(10) Patent No.: US 7,561,103 B2
(45) Date of Patent: Jul. 14, 2009

(54) METHOD AND DEVICE FOR GENERATING A CONSTANT ENVELOPE NAVIGATION SIGNAL WITH FOUR INDEPENDENT CODES

(75) Inventor: Laurent Lestarquit, Toulouse (FR)

(73) Assignee: Centre National d'Etudes Spatiales (C.N.E.S.), Paris (FR)

( * ) Notice: Subject to any disclaimer, the term of this patent is extended or adjusted under 35 U.S.C. 154(b) by 754 days.

(21) Appl. No.: 10/537,800

(22) PCT Filed: Dec. 12, 2003

(86) PCT No.: PCT/FR03/03695

§ 371 (c)(1),
(2), (4) Date: Jun. 7, 2005

(87) PCT Pub. No.: WO2004/055541

PCT Pub. Date: Jul. 1, 2004

(65) Prior Publication Data

US 2006/0038716 A1 Feb. 23, 2006

(30) Foreign Application Priority Data

Dec. 13, 2002 (FR) .................................. 02 15848

(51) Int. Cl.
*H04B 7/185* (2006.01)
*H03H 7/30* (2006.01)
*H03H 7/40* (2006.01)
*H03K 5/159* (2006.01)

(52) U.S. Cl. .................. 342/358; 342/357.03; 375/235
(58) Field of Classification Search ................ 375/235; 342/357.03, 358
See application file for complete search history.

(56) References Cited

U.S. PATENT DOCUMENTS

| 4,308,617 | A | | 12/1981 | German |
| 5,022,049 | A | | 6/1991 | Abrahamson et al. |
| 5,459,763 | A | * | 10/1995 | Hori et al. ................... 375/354 |
| 5,637,826 | A | * | 6/1997 | Bessacini et al. ........... 114/21.1 |
| 5,808,986 | A | * | 9/1998 | Jewell et al. .............. 369/44.37 |
| 5,995,233 | A | * | 11/1999 | Ohtomo et al. ............. 356/400 |
| 6,075,810 | A | | 6/2000 | Holmes et al. |
| 6,335,951 | B1 | * | 1/2002 | Cangiani et al. ............ 375/298 |

OTHER PUBLICATIONS

L. Ries, L. Lestarquit, E. Armengou-Miret, F. Legrand, W. Vigneau, C. Bourga, P. Erhard, JL. Issler: "A software simulation tool for GNSS BOC signals analysis" Proceedings of the Institute of Navigation (ION), GPS, Sep. 24-27, 2002, pp. 2228-2239, XP002273298 Portland p. 2228-p. 2230.

G.W. Hein, J. Godet, JL. Issler, JC. Martin, P. Erhard, R. Lucas-Rodriguez, T. Pratt: "Status of Galileo Frequency and Signal Design" Proceedings of the Institute of Navigation (ION), GPS, Sep. 24-27, 2002, pp. 266-277, XP002273300 Portland p. 275-p. 277.

Understanding GPS: Principles and Applications, Elliott D. Kaplan, editions Artech Housse, 1996.

* cited by examiner

*Primary Examiner*—David C Payne
*Assistant Examiner*—Brian J Stevens
(74) *Attorney, Agent, or Firm*—Young & Thompson

(57) ABSTRACT

A method and a device for generating a modulated navigation signal which is intended to be used to position a downlink receiver. Four pseudorandom navigation codes of chip rhythms greater than 0.5 MHz are modulated onto a carrier of frequency greater than 500 MHz according to an 8-PSK modulation of constant amplitude with a modulation frequency fM such that: $8fc \leq fM$ where $fc = Max(fci)$, and $fci$ designates the chip rhythms.

20 Claims, 10 Drawing Sheets ive invention

METHOD AND DEVICE FOR GENERATING A CONSTANT ENVELOPE NAVIGATION SIGNAL WITH FOUR INDEPENDENT CODES

BACKGROUND OF THE INVENTION

The invention concerns a method and device for generating, on board a space satellite or from a terrestrial beacon (pseudosatellite), a modulated navigation signal for positioning a downlink receiver, comprising four pseudorandom navigation codes of frequency greater than 0.5 MHz which are modulated onto the same carrier of frequency fp greater than 500 MHz, typically between 1000 MHz and 1700 MHz.

DESCRIPTION OF THE RELATED ART

The generation of modulated navigation signals such as those which are encountered for the GPS or Galileo constellations or other systems such as GLONASS, KOMPASS, BEIDOU or the pseudosatellites is specific, and in particular completely distinct from what is encountered for telecommunication signals carrying information and data.

In fact, a navigation signal for positioning a downlink receiver essentially carries pseudorandom codes which are formed of digital sequences of high frequency cadence, repeated over a very long period, the main function being to make it possible to date the emission and not to transmit digital data. At least one of the pseudorandom codes can also, secondarily, carry data (digital data or navigation messages such as position of satellite(s), drift of onboard clock, ionospheric corrections, almanacs or ephemerides, etc.), but at a much lower rhythm (typically 25 to 500 bit/s, whereas the frequency of the pseudorandom code is greater than 0.5 MHz).

The receiver compares each pseudorandom code with a replica, in such a way as to determine the "pseudodistance" corresponding to the sum of the trip time and the clock skew between the emitting satellite and the receiver.

The publication "Status of Galileo Frequency and Signal Design" by Guenter W. HEIN, Jeremie GODET, Jean-Luc ISSLER, Jean-Christophe MARTIN, Philippe ERHARD, RafaëLUCAS-RODRIGUEZ, Tony PRATT, 25/09/2002, http//europa.eu.int/comm/dgs/energy_transport/galileo/documents/technical_en.htm, describes the various modulation schemes which are known and can be imagined to implement a modulated navigation signal.

In particular, for modulation in the E5 band which must transmit four navigation codes in a 10 MHz cadence, this document provides either two QPSK signals on two distinct bands E5a, E5b (two distinct carriers, multiplexed), or a single broadband signal which is generated according to a modulation of the type called BOC ("binary offset carrier"), using a square subcarrier. The advantage of modulation of BOC type is actually to make it possible to transmit multiple codes on a single carrier, resulting in identical skews. BOC modulation also makes it possible to avoid degrading the signal-to-noise ratio. In fact, it makes it possible to do without multiplexers, and thus to limit the losses in the payload and to transmit the secondary lobes of the signal if they exist. Additionally, because a single amplification chain is used, the variations of the propagation time of the various codes are correlated, resulting in improved performance.

The above-mentioned document is also a reminder of the importance of generating the modulated signal with a constant envelope, in such a way as to be able to optimize the functioning of the power amplifier, and to avoid having to provide a linear amplifier and/or one which has a certain backoff (and therefore less efficiency), has greater volume, and is heavier. Concerning this, it should be noted that the problem is particularly important to the extent that the power amplifier represents the greatest part of the mass and volume of the onboard electronic circuit for emitting the navigation signal. As the above-mentioned document indicates, the use of alternative (or baseband) BOC modulation comprising a complex rectangular subcarrier (which is interesting, in particular, because it can be generated in digital form) was considered. But if transmission of four codes with such modulation is desired, a navigation signal with non-constant envelope, and of which the value may even be zero, is necessarily obtained. The same happens if a sinusoidal subcarrier is used. This is why this document announces the use of a variant which makes it possible to generate the four codes with a constant envelope by 8-PSK modulation, but does not describe at all the method or device which makes it possible to obtain such a surprising result.

SUMMARY OF THE INVENTION

The invention is thus aimed at proposing a method and device for generating such a broadband modulated navigation signal, which can carry four pseudorandom navigation codes on the same carrier while presenting a constant envelope.

To do this, the invention concerns a method of generating—in particular on board a space system—a modulated navigation signal which is intended to be used to position a downlink receiver, comprising multiple pseudorandom navigation codes of chip rhythms greater than 0.5 MHz, modulated onto a carrier of frequency fp greater than 500 MHz, wherein four pseudorandom navigation codes C1, C2, C1', C2' are modulated onto the carrier according to an 8-PSK modulation of constant amplitude with a modulation frequency fM such that:

$$8fc \leq fM$$

where fc=Max(fci), and fci designates the chip rhythms fc1, fc1', fc2, fc2' of the navigation codes C1, C2, C1', C2', each fci value being such that fM=Ni.fci, Ni being an integer greater than or equal to 8, two navigation codes C1, C1' being quadrature modulated at frequency f1=fp−fM/8, and two other navigation codes C2, C2' being quadrature modulated at frequency f2=fp+fM/8, and the modulated navigation signal presenting a constant envelope.

The navigation signal according to the invention has a spectral separation of the codes, which are distributed in two main lobes around the carrier frequency.

Advantageously and according to the invention, fM is chosen to be ≦400 MHz. More particularly, in the case of a method which is implemented on board a space system, fM is chosen to be ≦200 MHz.

It can be seen that such modulation actually corresponds to LOC ("linear offset carrier") modulation with a sinusoidal subcarrier of frequency fM/8, but made discrete so that only the points which correspond to the 8-PSK constant amplitude constellation are addressed. In this way, surprisingly, transmission on a single carrier of four distinct, independent pseudorandom navigation codes combined on a single baseband modulation signal of constant envelope at output is achieved, with a spectral occupation centered on f1 for C1 and C1' and on f2 for C2 and C2', and with a small gap between f1 and f2 (less than 100 MHz), in particular less than 50 MHz on board a space system). In particular, it should be noted that with such a small frequency gap, the solution which would consist of multiplexing the modulated and amplified signals separately for each frequency f1, f2 would not give satisfactory practical results, particularly on board a space system. In fact, this solution would make excessively narrow filtering of each of the modulated signals necessary, resulting in loss of quality of the navigation signal and making it useless in practice.

Additionally, the condition that 8fc≦fM makes it possible to ensure that the frequency of the subcarrier is greater than the chip rhythm of the pseudorandom codes.

Advantageously and according to the invention, 8-PSK modulation of symmetrical constant amplitude in the Fresnel plan is used. In a variant, 8-PSK modulation of asymmetrical constant amplitude in the Fresnel plan is used.

Advantageously and according to the invention, 8-PSK modulation of phase states equal to $k.\pi/4$, where k is an integer between 1 and 8, is used. Thus for pseudorandom codes taking the values 1 and −1, the baseband modulation signal can take the following values:

$$2.\exp[jk.\pi/4], k\in\{1,2,3,4,5,6,7,8\}$$

Advantageously and according to the invention, the four codes are modulated according to a truth table which is chosen from the group of truth tables formed from:

TABLE 1

| | | | | | | | | | | | | | | | | |
|---|---|---|---|---|---|---|---|---|---|---|---|---|---|---|---|---|
| C1 (t) | −1 | −1 | −1 | −1 | −1 | −1 | −1 | −1 | 1 | 1 | 1 | 1 | 1 | 1 | 1 | 1 |
| C2 (t) | −1 | −1 | −1 | −1 | 1 | 1 | 1 | 1 | −1 | −1 | −1 | −1 | 1 | 1 | 1 | 1 |
| C1' (t) | −1 | −1 | 1 | 1 | −1 | −1 | 1 | 1 | −1 | −1 | 1 | 1 | −1 | −1 | 1 | 1 |
| C2' (t) | −1 | 1 | −1 | 1 | −1 | 1 | −1 | 1 | −1 | 1 | −1 | 1 | −1 | 1 | −1 | 1 |
| t modulo 8TM | | | | | | | | | | | | | | | | |
| [0, TM[ | P5 | P4 | P4 | P3 | P6 | P7 | P5 | P2 | P6 | P1 | P3 | P2 | P7 | P8 | P8 | P1 |
| [TM, 2TM[ | P5 | P8 | P4 | P3 | P6 | P7 | P5 | P6 | P2 | P1 | P3 | P2 | P7 | P8 | P4 | P1 |
| [2TM, 3TM[ | P1 | P8 | P4 | P7 | P6 | P7 | P5 | P6 | P2 | P1 | P3 | P2 | P3 | P8 | P4 | P5 |
| [3TM, 4TM[ | P1 | P8 | P8 | P7 | P2 | P7 | P5 | P6 | P2 | P1 | P3 | P6 | P3 | P4 | P4 | P5 |
| [4TM, 5TM[ | P1 | P8 | P8 | P7 | P2 | P3 | P1 | P6 | P2 | P5 | P7 | P6 | P3 | P4 | P4 | P5 |
| [5TM, 6TM[ | P1 | P4 | P8 | P7 | P2 | P3 | P1 | P2 | P6 | P5 | P7 | P6 | P3 | P4 | P8 | P5 |
| [6TM, 7TM[ | P5 | P4 | P8 | P3 | P2 | P3 | P1 | P2 | P6 | P5 | P7 | P6 | P7 | P4 | P8 | P1 |
| [7TM, 8TM[ | P5 | P4 | P4 | P3 | P6 | P3 | P1 | P2 | P6 | P5 | P7 | P2 | P7 | P8 | P8 | P1 |

TABLE 2

| | | | | | | | | | | | | | | | | |
|---|---|---|---|---|---|---|---|---|---|---|---|---|---|---|---|---|
| C1 (t) | −1 | −1 | −1 | −1 | −1 | −1 | −1 | −1 | 1 | 1 | 1 | 1 | 1 | 1 | 1 | 1 |
| C2 (t) | −1 | −1 | −1 | −1 | 1 | 1 | 1 | 1 | −1 | −1 | −1 | −1 | 1 | 1 | 1 | 1 |
| C1' (t) | −1 | −1 | 1 | 1 | −1 | −1 | 1 | 1 | −1 | −1 | 1 | 1 | −1 | −1 | 1 | 1 |
| C2' (t) | −1 | 1 | −1 | 1 | −1 | 1 | −1 | 1 | −1 | 1 | −1 | 1 | −1 | 1 | −1 | 1 |
| t modulo 8TM | | | | | | | | | | | | | | | | |
| [0, TM[ | P1 | P8 | P4 | P7 | P6 | P7 | P5 | P6 | P2 | P1 | P3 | P2 | P3 | P8 | P4 | P5 |
| [TM, 2TM[ | P1 | P8 | P8 | P7 | P2 | P7 | P5 | P6 | P2 | P1 | P3 | P6 | P3 | P4 | P4 | P5 |
| [2TM, 3TM[ | P1 | P8 | P8 | P7 | P2 | P3 | P1 | P6 | P2 | P5 | P7 | P6 | P3 | P4 | P8 | P5 |
| [3TM, 4TM[ | P1 | P4 | P8 | P7 | P2 | P3 | P1 | P2 | P6 | P5 | P7 | P6 | P3 | P4 | P8 | P5 |
| [4TM, 5TM[ | P5 | P4 | P8 | P3 | P2 | P3 | P1 | P2 | P6 | P5 | P7 | P6 | P7 | P4 | P8 | P1 |
| [5TM, 6TM[ | P5 | P4 | P4 | P3 | P6 | P3 | P1 | P2 | P6 | P5 | P7 | P2 | P7 | P8 | P8 | P1 |
| [6TM, 7TM[ | P5 | P4 | P4 | P3 | P6 | P7 | P5 | P2 | P6 | P1 | P3 | P2 | P7 | P8 | P8 | P1 |
| [7TM, 8TM[ | P5 | P8 | P4 | P3 | P6 | P7 | P5 | P6 | P2 | P1 | P3 | P2 | P7 | P8 | P4 | P1 | where P1, P2, P3, P4, P5, P6, P7, P8 are the various contacts and the 8-PSK constellation, and TM=1/fM, and other truth tables derived from these truth tables TABLE 1 and TABLE 2 by phase rotation by $n.\pi/4$, $n\in\{1,2,3,4,5,6,7\}$ and/or reversal of the direction of the path of the constellation. The changes of state of one combination of the four codes to another take place in a pseudorandom fashion according to a frequency which is a multiple of fM (including fM itself). Advantageously and according to the invention, fp is between 1000 MHz and 1700 MHz (band L). Advantageously and according to the invention, fc is of the order of 10 MHz. Advantageously and according to the invention, fM is of the order of 120 MHz. Advantageously and according to the invention, in at least one pair of codes C1, C1'; C2, C2' which are quadrature modulated onto the same frequency, one C1'; C2' incorporates digital data which is modulated according to a frequency less than fc/1000. Thus each pair of codes can incorporate digital data.

The invention extends to a device for implementing a method according to the invention. The invention thus concerns a device for generating—in particular on board a space system—a modulated navigation signal which is intended to be used to position a downlink receiver, comprising multiple pseudorandom navigation codes of chip rhythms greater than 0.5 MHz which are modulated onto a carrier of frequency fp greater than 500 MHz, this device comprising:

a circuit to generate pseudorandom navigation codes, a phase-shifting modulator circuit which supplies the modulated navigation signal on the carrier, an emitter circuit, comprising at least one power amplification stage, and suitable for emitting a radio frequency signal corresponding to the modulated navigation signal, wherein the modulator circuit is suitable for modulating, on the carrier, four random navigation codes C1, C2, C1', C2' according to an 8-PSK modulation of constant amplitude with a modulation frequency fM such that:

8fc≦fM where fc=Max(fci), and fci designates the chip rhythms fc1, fc1', fc2, fc2' of the navigation codes C1, C2, C1', C2', each fci value being such that fM=Ni.fci, Ni being an integer greater than or equal to 8, two navigation codes C1, C1' being quadrature modulated at frequency f1=fp−fM/8, and two other navigation codes C2, C2' being quadrature modulated at frequency f2=fp+fM/8, and the modulated navigation signal presenting a constant envelope.

Advantageously and according to the invention, the modulator circuit is suitable for implementing an 8-PSK modulation with a modulation frequency fM≦400 MHz. In particular, in the case of a device which is intended to be placed on board a space satellite, advantageously and according to the invention, the modulator circuit is suitable for implementing an 8-PSK modulation with a modulation frequency fM≦200 MHz.

Advantageously and according to the invention, the modulator circuit is suitable for implementing an 8-PSK modulation of symmetrical constant amplitude in the Fresnel plan.

As a variant, the modulator circuit is suitable for implementing an 8-PSK modulation of asymmetrical constant amplitude in the Fresnel plan.

Advantageously and according to the invention, the modulator circuit is suitable for implementing an 8-PSK modulation with phase states equal to kπ/4, k being an integer between 1 and 8. Advantageously and according to the invention, the modulator circuit is suitable for modulating the four codes according to a truth table as described above. Advantageously and according to the invention, fp is between 1000 MHz and 1700 MHz. Advantageously and according to the invention, fc is of the order of 10 MHz. Advantageously and according to the invention, fM is of the order of 120 MHz. Advantageously and according to the invention, the device is suitable so that, in at least one pair of codes C1, C1'; C2, C2' which are quadrature modulated onto the same frequency, one, C1', C2' incorporates digital data which is modulated according to a frequency less than fc/1000.

The invention thus makes it possible, very simply, to transmit, by a single modulated navigation signal, four independent pseudorandom codes, by 8-PSK modulation which can be assimilated to LOC modulation with a sinusoidal subcarrier which is made discrete so that only the points of constant amplitude are selected.

The invention also concerns a method and a device which in combination have all or some of the characteristics mentioned above or below.

BRIEF DESCRIPTION OF THE DRAWINGS

Other aims, characteristics and advantages of the invention appear on reading the following description, which refers to the attached figures, in which.

DESCRIPTION OF THE PREFERRED EMBODIMENT

Figure 1:
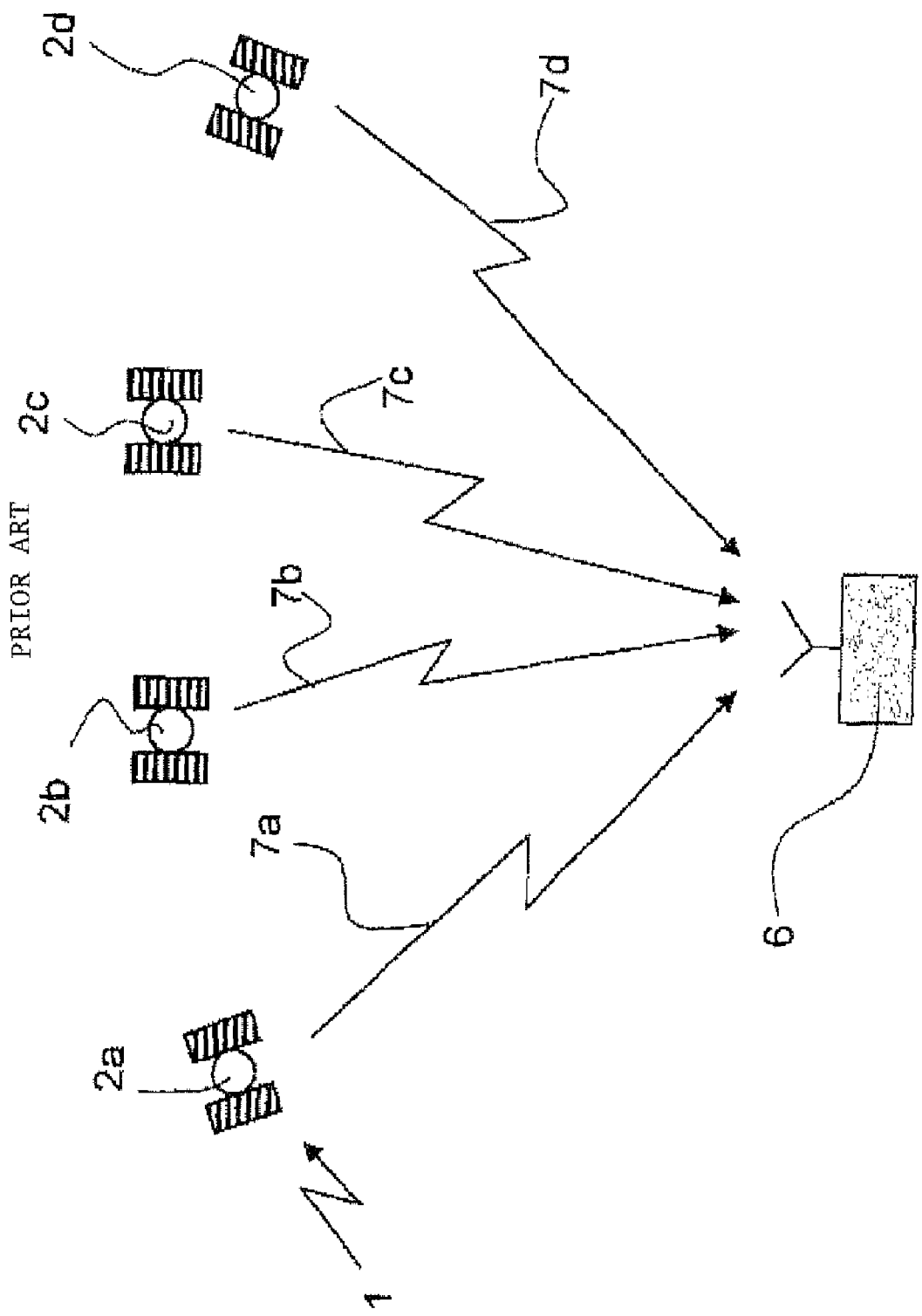
FIG. 1 is a diagram of a constellation of navigation satellites such as GPS or Galileo.

The device according to the invention is intended to be placed on board a space system such as a satellite 2a, 2b, 2c, 2d belonging to a constellation 1 of satellites which are suitable for allowing radio navigation and/or radio positioning of receivers 6 on Earth or on a terrestrial satellite—particularly terrestrial receivers or receivers on board satellites or aircraft—. In particular, the invention is intended for equipping satellites of the Galileo constellation for emitting navigation codes in the E5 band.

A device according to the invention can also, as a variant or in combination, be used in pseudolites (or pseudosatellites), which are beacons, generally on the ground, which generate a navigation signal which is close to a navigation signal which a satellite broadcasts.

Each satellite 2a, 2b, 2c, 2d thus includes a device according to the invention for generating a modulated navigation signal 7a, 7b, 7c, 7d comprising multiple pseudorandom navigation codes which are intended to be used to position the downlink receiver 6.

This generating device comprises a receiving antenna 8 which is associated with a circuit 9 to receive the data, in such a way that the generating device can receive navigation data or messages—in particular coming in general from the ground, for management of the constellation 1 by the ground control segment—which can be incorporated in whole or in part into the modulated navigation signal.

The generating device also includes a clock circuit 10 which supplies a reference frequency f0 to a circuit 11 for generating navigation codes, and to a circuit 12 for generating the carrier signal. The circuit 11 for generating navigation codes may receive data from the data receiver 9. The navigation codes from the circuit 11 are modulated by a modulator circuit 13 onto the carrier signal from the circuit 12. The thus obtained modulated signal is delivered to an emission antenna 14 via an amplification and filtering emitter circuit 15, in such a way that the emission antenna 14 emits the modulated navigation signal 7 which carries the various pseudorandom navigation codes.

Figure 3:
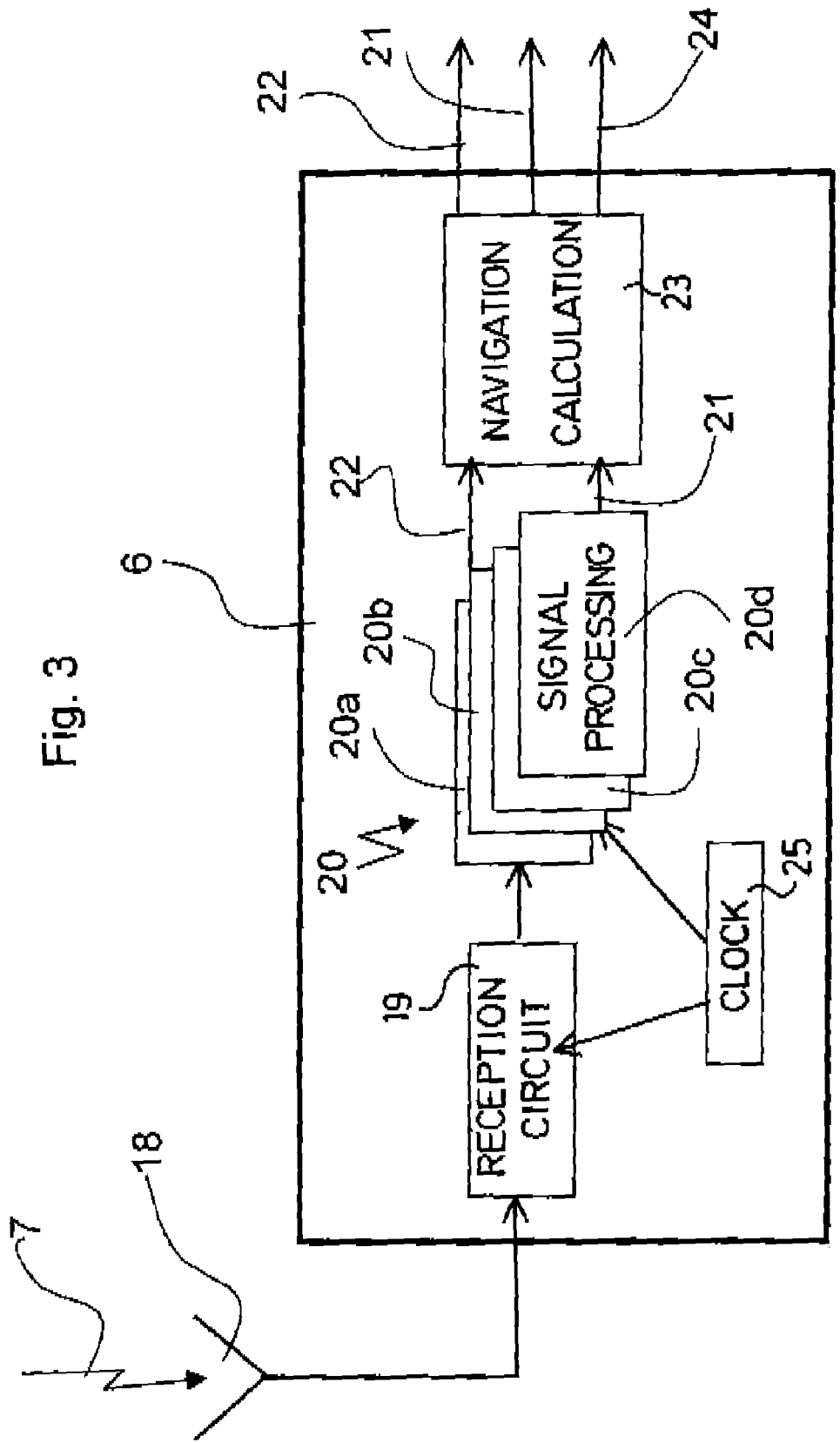
FIG. 3 is a circuit diagram of a circuit of a receiver for a modulated navigation signal for positioning by downlink.

This navigation signal 7 is received by a receiver 6, the circuit diagram of which is shown in FIG. 3. This receiver 6 comprises a reception antenna 18 which is associated with a radio frequency reception circuit 19 which comprises, in traditional fashion, an amplification, filtering, frequency conversion and analog/digital conversion chain. This radio frequency reception circuit 19 thus supplies a digital modulated signal to signal processing circuits 20, i.e. a circuit 20$a$, 20$b$, 20$c$, 20$d$ for each navigation signal 7$a$, 7$b$, 7$c$, 7$d$ from each satellite 2$a$, 2$b$, 2$c$, 2$d$, in such a way as to allow simultaneous processing of these signals. It should be noted that it is possible to use more than four satellites, and thus more than four processing circuits 20, in a receiver.

Each signal processing circuit 20 makes it possible to extract crude measurements 21 and, if applicable, navigation data (or messages) 22 carried by one and/or the other of the codes of the received modulated navigation signal. The crude measurements 21 consist, in particular, of a calculation of the pseudodistance between the corresponding 2$a$, 2$b$, 2$c$, 2$d$ and the receiver 6. It can also be a so-called "pseudospeed" or "integrated Doppler" calculation which is implemented on the carrier signal. These crude measurements are traditional and well known, particularly in the case of the GPS constellation.

These calculations, as well as all the known concepts concerning navigation and positioning by satellite, are described, for example, in the document UNDERSTANDING GPS: PRINCIPLES AND APPLICATIONS, Elliott D. KAPLAN, published by Artech Housse, 1996.

The crude measurements 21 and the navigation data 22 if any are supplied to a navigation calculation circuit 23, which supplies, on the one hand, the crude measurements 21 and navigation data 22 which it receives, and on the other hand, a calculation result 24, in particular a position signal of the receiver 6.

It should be noted that very many different known technologies and architectures for such a receiver 6 exist, in particular concerning the various signal processing circuits and the navigation calculation. The signals from the circuit 23 are supplied if appropriate to a digital processing device, for subsequent exploitation for navigation or positioning.

The receiver 6 also comprises a clock circuit 25, which supplies a reference frequency on the one hand to the radio frequency reception circuit 19, and on the other hand to the various signal processing circuits 20.

Figure 2:
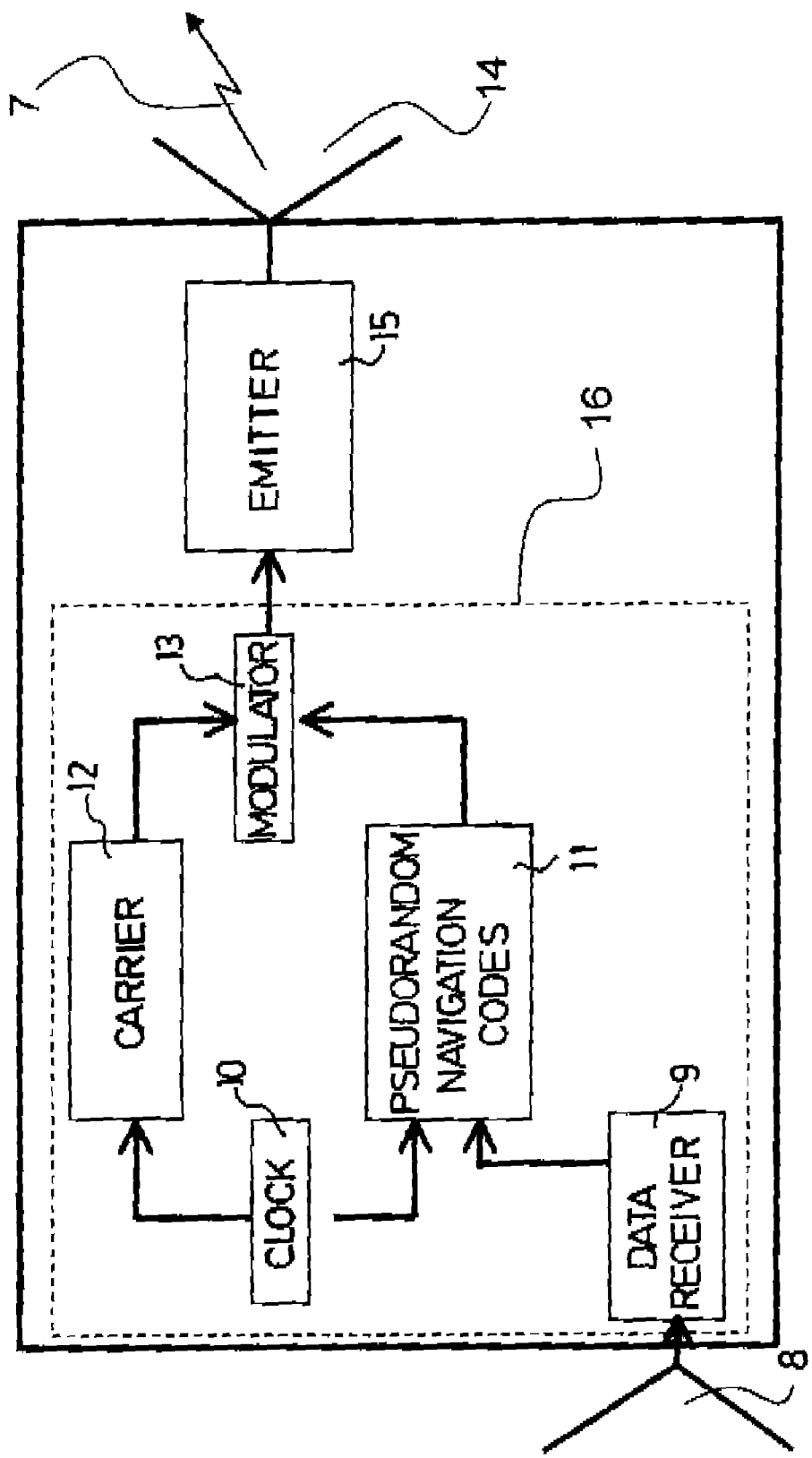
FIG. 2 is a circuit diagram of a device according to the invention.
Figure 4:
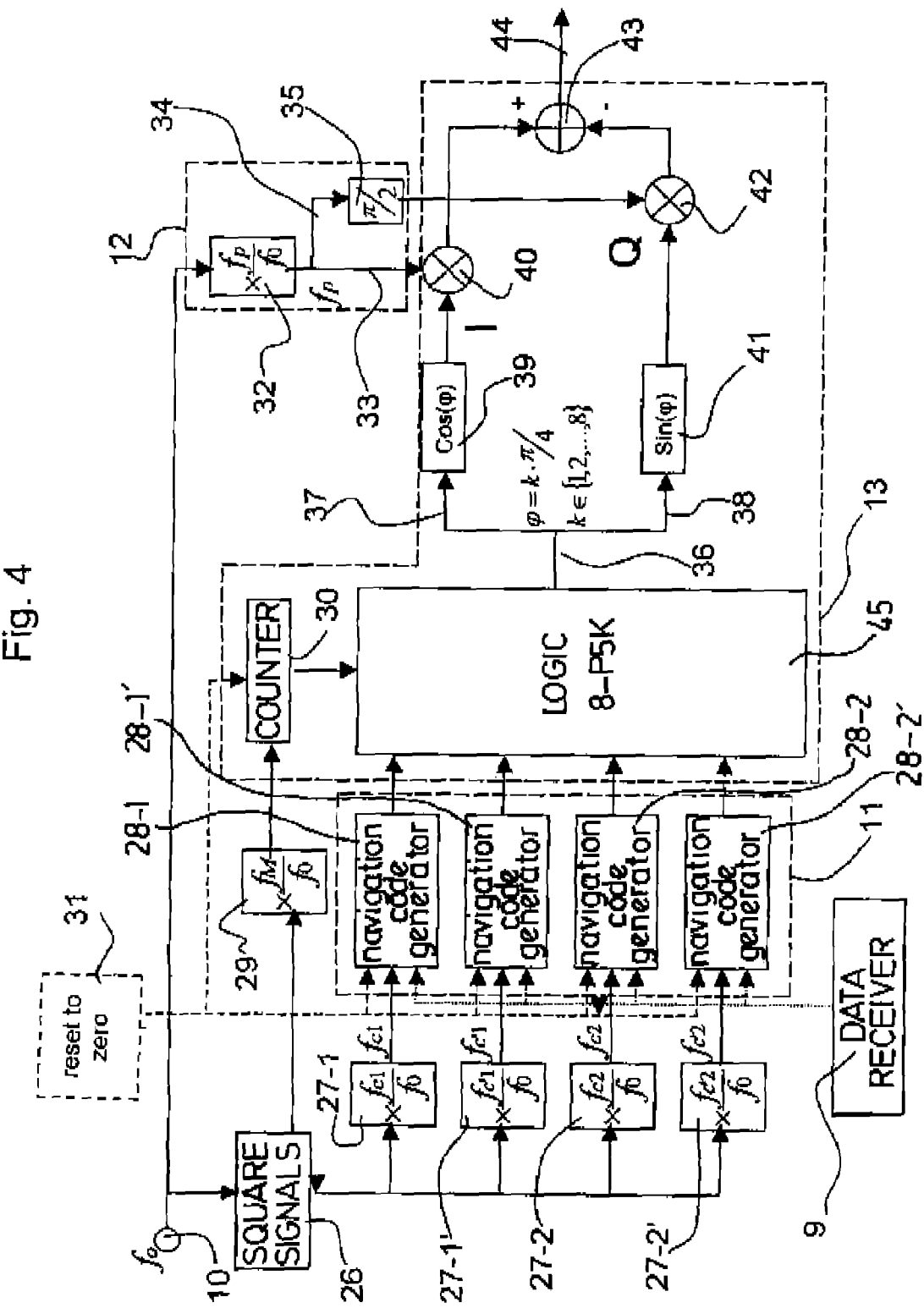
FIG. 4 is a more detailed diagram of a part of the device of FIG. 2 according to the invention.

FIG. 4 represents, in more detail, block 16, which comprises circuits 9, 10, 11, 12, 13 (represented in FIG. 2 by dotted lines), and which makes it possible to implement the method according to the invention.

This block 16 comprises the clock circuit 10 which generates an analog clock signal at the reference frequency fo, which, for example, is of the order of 10.23 MHz. This reference frequency fo is supplied to a circuit 26, which generates square signals, the cadence of which is based on the reference frequency f0. These square signals at the reference frequency f0 are supplied to four frequency converters 27-1, 27-1', 27-2, 27-2', which supply square signals of frequency fc1, fc1', fc2, fc2' respectively to four pseudorandom navigation code generator circuits 28-1, 28-1', 28-2, 28-2', which generate respectively four independent pseudorandom navigation codes C1, C1', C2, C2', which are intended to be incorporated into the navigation signal 7. The circuit 26, which generates square signals at frequency f0, also supplies these square signals to a frequency converter 29, which supplies square signals at a frequency fM, which is the modulation frequency, to a cyclical counter 30, which makes it possible to generate eight digital values, from 1 to 8, cyclically, so that the cadence of the modulator circuit 13 is based on the modulation frequency fM.

A reinitialization circuit 31 makes it possible to initialize and synchronize, at startup, the four code generator circuits 28-1, 28-1', 28-2, 28-2', as well as the counter 30, and thus the modulator 13.

The data receiver circuit 9 supplies navigation data (messages) as appropriate to one and/or the other of the code generator circuits 28-1, 28-1', 28-2, 28-2', in such a way that this navigation data can be integrated into the pseudorandom code, but at a much lower frequency. The four circuits 28-1, 28-1', 28-2, 28-2' form the circuit 11 shown in FIG. 2, the function of which is to generate the pseudorandom navigation codes.

The modulator circuit 13 is suitable for implementing the modulation in conformity with the method of the invention, according to a constant amplitude 8-PSK modulation with a modulation frequency fM which is defined by the signals which the counter 30 supplies.

The circuit 12 which generates the carrier signal is formed by a frequency converter circuit 32, which receives the analog clock signal at the reference frequency $f_0$ and supplies an analog signal at the frequency of the carrier fp. The carrier signal fp is supplied to two parallel carrier branches, of which one 33 supplies the carrier signal in phase, and the other 34 comprises a π/2 phase-shifting circuit 35 which supplies a carrier signal in quadrature at frequency fp.

The modulation frequency fM is chosen so that:

$$8fc \leq fM$$

where fc=Max(fci), and fci designates the chip rhythms fc1, fc1', fc2, fc2' of the navigation codes C1, C2, C1', C2', each fci value being such that fM=Ni.fci, Ni being an integer greater than or equal to 8, two navigation codes C1, C1' being quadrature modulated at frequency f1=fp−fM/8, and two other navigation codes C2, C2' being quadrature modulated at frequency f2=fp+fM/8, and the modulated navigation signal presenting a constant envelope. In particular, fM is chosen to be ≦400 MHz, and more particularly, fM is chosen to be ≦200 MHz, for an onboard device. Max designates the maximum function, fc being the greatest value of fci.

The various chip rhythms fci of the pseudorandom navigation codes (cadencing frequencies of these codes) are all greater than 0.5 MHz, and preferably greater than 1 MHz. Typically, in the Galileo constellation, the intended chip rhythm is 2.046 MHz for all codes.

In practice, the four codes can have the same chip rhythm, i.e. fci=fc. Nevertheless, nothing prevents using codes with different rhythms, provided that they satisfy the condition fM=Ni.fci.

The frequency of the carrier fp must be greater than 500 MHz, and is typically between 1000 MHz and 1700 MHz. For example, in the context of the Galileo constellation, band E5a is at a carrier frequency of 1176.45 MHz and band E5b is at a carrier frequency of 1207.14 MHz. Band E1 is at 1589.742 MHz and band G1 extends as far as 1610 MHz.

Figure 8:
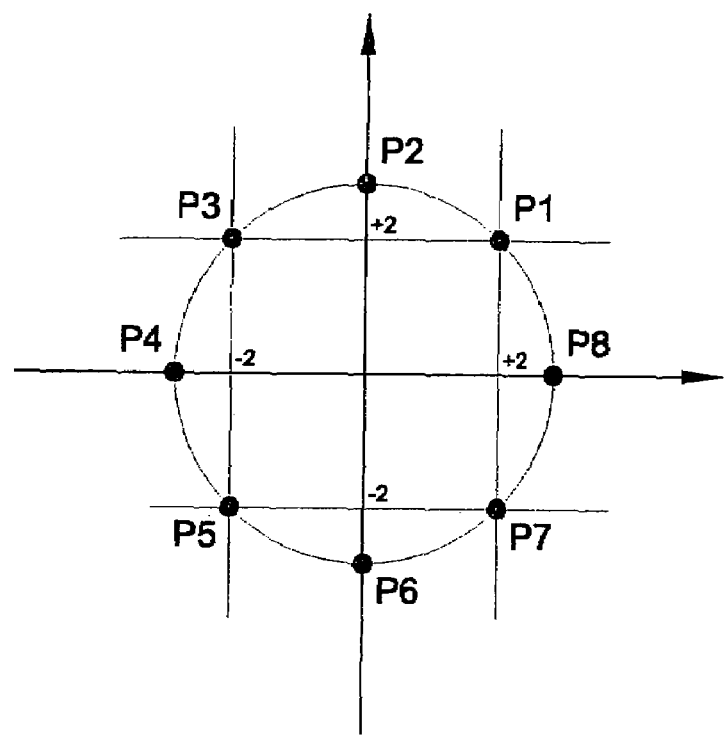
FIG. 8 is a diagram in the Fresnel plan, representing an 8-PSK modulation constellation which can be used in a method according to the invention.

The modulator circuit 13 comprises a logic circuit 45, which supplies, at its output 36, a baseband 8-PSK modulation signal at frequency fM, carrying the four navigation codes C1, C2, C1', C2'. This modulation signal can thus take eight phase states, corresponding to the constellation of 8-PSK modulation, i.e. to the various contacts P1, P2, P3, P4, P5, P6, P7, P8 of this constellation, as shown in FIG. 8.

To develop this modulation signal, the logic circuit 45 uses four navigation codes, e.g. according to the following truth table:

TABLE 1

| | | | | | | | | | | | | | | | | |
|---|---|---|---|---|---|---|---|---|---|---|---|---|---|---|---|---|
| C1 (t) | −1 | −1 | −1 | −1 | −1 | −1 | −1 | −1 | 1 | 1 | 1 | 1 | 1 | 1 | 1 | 1 |
| C2 (t) | −1 | −1 | −1 | −1 | 1 | 1 | 1 | 1 | −1 | −1 | −1 | −1 | 1 | 1 | 1 | 1 |
| C1' (t) | −1 | −1 | 1 | 1 | −1 | −1 | 1 | 1 | −1 | −1 | 1 | 1 | −1 | −1 | 1 | 1 |
| C2' (t) | −1 | 1 | −1 | 1 | −1 | 1 | −1 | 1 | −1 | 1 | −1 | 1 | −1 | 1 | −1 | 1 |
| | | | | | t modulo 8TM | | | | | | | | | | | |
| [0, TM[ | P5 | P4 | P4 | P3 | P6 | P7 | P5 | P2 | P6 | P1 | P3 | P2 | P7 | P8 | P8 | P1 |
| [TM, 2TM[ | P5 | P8 | P4 | P3 | P6 | P7 | P5 | P6 | P2 | P1 | P3 | P2 | P7 | P8 | P4 | P1 |
| [2TM, 3TM[ | P1 | P8 | P4 | P7 | P6 | P7 | P5 | P6 | P2 | P1 | P3 | P2 | P3 | P8 | P4 | P5 |
| [3TM, 4TM[ | P1 | P8 | P8 | P7 | P2 | P7 | P5 | P6 | P2 | P1 | P3 | P6 | P3 | P4 | P4 | P5 |
| [4TM, 5TM[ | P1 | P8 | P8 | P7 | P2 | P3 | P1 | P6 | P2 | P5 | P7 | P6 | P3 | P4 | P4 | P5 |
| [5TM, 6TM[ | P1 | P4 | P8 | P7 | P2 | P3 | P1 | P2 | P6 | P5 | P7 | P6 | P3 | P4 | P8 | P5 |
| [6TM, 7TM[ | P5 | P4 | P8 | P3 | P2 | P3 | P1 | P2 | P6 | P5 | P7 | P6 | P7 | P4 | P8 | P1 |
| [7TM, 8TM[ | P5 | P4 | P4 | P3 | P6 | P3 | P1 | P2 | P6 | P5 | P7 | P2 | P7 | P8 | P8 | P1 |

In this truth table, TM equals 1/fM.

This truth table corresponds to the expression of the baseband modulation signal x(t) which is supplied at the output 36 according to the following equations:

$$x(t) = \frac{2}{\sqrt{2}} \cdot [$$

$$sign[\cos(2\pi(fM/8)t + k1\pi/2)] + j \cdot k2 sign[\cos(2\pi(fM/8) + k1\pi/2]$$

or $$x(t) = 2(j)^{k1} \cdot sign[\cos(2\pi(fM/8)t + k2\pi/4]$$

with k1ϵ{1,2,3,4} and k2=±1

These equations can themselves be obtained from the expression of the baseband modulation signal of a modulation of LOC type with a sinusoidal subcarrier, but making this modulation discrete so that only the point phase states of the same amplitude are retained.

It is clear that it is also possible to use one of the seven other truth tables which are defined starting with this truth table TABLE 1, by simple rotation by n.π/4, where n is an integer between 1 and 7. In fact, the constellation of FIG. 8 corresponds to eight equivalent constellations, depending only on the position which is chosen for one of the contacts, e.g. contact P1.

It should also be noted that the eight truth tables which can be obtained with a constellation similar to that of FIG. 8 but with contacts which are passed through clockwise (and not anticlockwise as in FIG. 8) are actually identical, apart from the rotation, to the eight truth tables defined previously, and can therefore also be used. In fact, it is enough to invert C1, C1' and C2, C2' to go from a constellation which is passed through in one direction to the constellation with the same contacts but passed through in the reverse direction.

It is equally possible to use the following truth table:

TABLE 2

| | | | | | | | | | | | | | | | | |
|---|---|---|---|---|---|---|---|---|---|---|---|---|---|---|---|---|
| C1 (t) | −1 | −1 | −1 | −1 | −1 | −1 | −1 | −1 | 1 | 1 | 1 | 1 | 1 | 1 | 1 | 1 |
| C2 (t) | −1 | −1 | −1 | −1 | 1 | 1 | 1 | 1 | −1 | −1 | −1 | −1 | 1 | 1 | 1 | 1 |
| C1' (t) | −1 | −1 | 1 | 1 | −1 | −1 | 1 | 1 | −1 | −1 | 1 | 1 | −1 | −1 | 1 | 1 |
| C2' (t) | −1 | 1 | −1 | 1 | −1 | 1 | −1 | 1 | −1 | 1 | −1 | 1 | −1 | 1 | −1 | 1 |
| | | | | | t modulo 8TM | | | | | | | | | | | |
| [0, TM[ | P1 | P8 | P4 | P7 | P6 | P7 | P5 | P6 | P2 | P1 | P3 | P2 | P3 | P8 | P4 | P5 |
| [TM, 2TM[ | P1 | P8 | P8 | P7 | P2 | P7 | P5 | P6 | P2 | P1 | P3 | P6 | P3 | P4 | P4 | P5 |
| [2TM, 3TM[ | P1 | P8 | P8 | P7 | P2 | P3 | P1 | P6 | P2 | P5 | P7 | P6 | P3 | P4 | P4 | P5 |
| [3TM, 4TM[ | P1 | P4 | P8 | P7 | P2 | P3 | P1 | P2 | P6 | P5 | P7 | P6 | P3 | P4 | P8 | P5 |
| [4TM, 5TM[ | P5 | P4 | P8 | P3 | P2 | P3 | P1 | P2 | P6 | P5 | P7 | P6 | P7 | P4 | P8 | P1 |
| [5TM, 6TM[ | P5 | P4 | P4 | P3 | P6 | P3 | P1 | P2 | P6 | P5 | P7 | P2 | P7 | P8 | P8 | P1 |
| [6TM, 7TM[ | P5 | P4 | P4 | P3 | P6 | P7 | P5 | P2 | P6 | P1 | P3 | P2 | P7 | P8 | P8 | P1 |
| [7TM, 8TM[ | P5 | P8 | P4 | P3 | P6 | P7 | P5 | P6 | P2 | P1 | P3 | P2 | P7 | P8 | P4 | P1 |

In this truth table, TM equals 1/fM.

It should also be noted that the eight truth tables which can be obtained with a constellation similar to that of FIG. 8 but with contacts which are passed through clockwise. (and not $$x(t) = \frac{2}{\sqrt{2}} \cdot [sign[\sin(2\pi(fM/8)t + k1\pi/2)]] +$$

$$j \cdot k2 sign[\sin(2\pi(fM/8) + k1\pi/2)] \text{ or}$$

$$x(t) = 2(j)^{k1} \cdot sign[\sin(2\pi(fM/8)t + k2\pi/4)]$$

with k1ϵ{1,2,3,4} and k 2=±1

It is also possible to use one of the seven other truth tables which are defined starting with this truth table TABLE 2, by simple rotation by n.π/4, where n is an integer between 1 and 7.

Here too, the eight truth tables which can be obtained with a similar constellation but with contacts which are passed through in the reverse direction are actually identical, apart from the rotation, to the eight truth tables defined previously, and can therefore also be used.

There are thus thirty-two truth tables in the group of truth tables which can be used and corresponding to the constellation shown in FIG. 8, where the eight contacts are distributed symmetrically on a circle (constant amplitude) and phase-shifted by π/4, four contacts being on the axes of the Fresnel plan.

Thus the method according to the invention can be assimilated to modulation of alternative BOC type (with two frequencies f1 and f2 around the carrier frequency and separated from this carrier frequency by a subcarrier frequency of value fM/8), but defined starting with a subcarrier of cosine or sine type (such as is used for LOC modulation, of which only certain discrete points are exploited, to ensure that the baseband modulation signal is of constant amplitude).

The baseband modulation signal x(t) which is supplied at the output 36 of the modulation logic circuit 45 is supplied to one branch 37 in phase and to one branch 38 in quadrature. The in-phase branch 37 comprises a filter 39 which extracts the in-phase values I from the modulation signal, and a mixer 40 which combines them with the carrier signal at frequency fp from the in-phase carrier branch 33. Similarly, the in-quadrature branch 38 comprises a filter 41 which extracts the in-quadrature values Q from the modulation signal, and a mixer 42 which modulates these values onto the carrier signals at frequency fp, which the in-quadrature carrier branch 34 supplies. The signals, modulated in phase (at the output of the branch 37) and in quadrature (at the output of the branch 38), are combined by an in-phase adder circuit 43, which supplies a single modulated signal at the output 44, which is connected to the input of the amplification and filtering emitter circuit 15, for emission of the modulated navigation signal 7.

Figure 7:
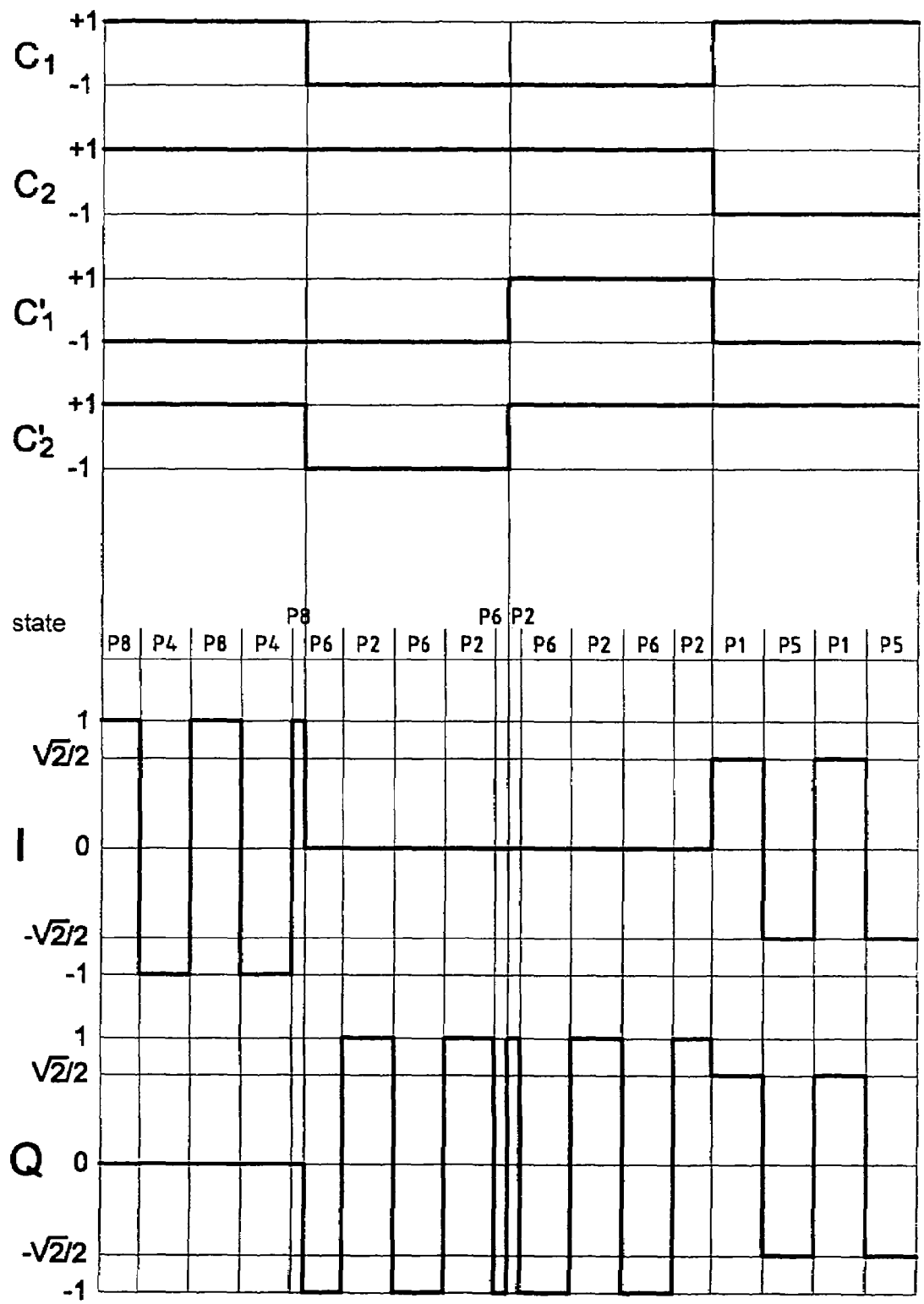
FIG. 7 is a diagram representing an example of the timing diagrams of the navigation codes and the paths I, Q of a navigation signal in a method according to the invention.

FIG. 7 gives an example of timing diagrams for the four codes C1, C2, C1', C2' and for the paths I and Q of the modulation signal which are used at the input of the mixer circuits 40, 42. With this modulation signal, the modulated signal which is supplied at the output 44 presents a constant envelope.

Figure 5:
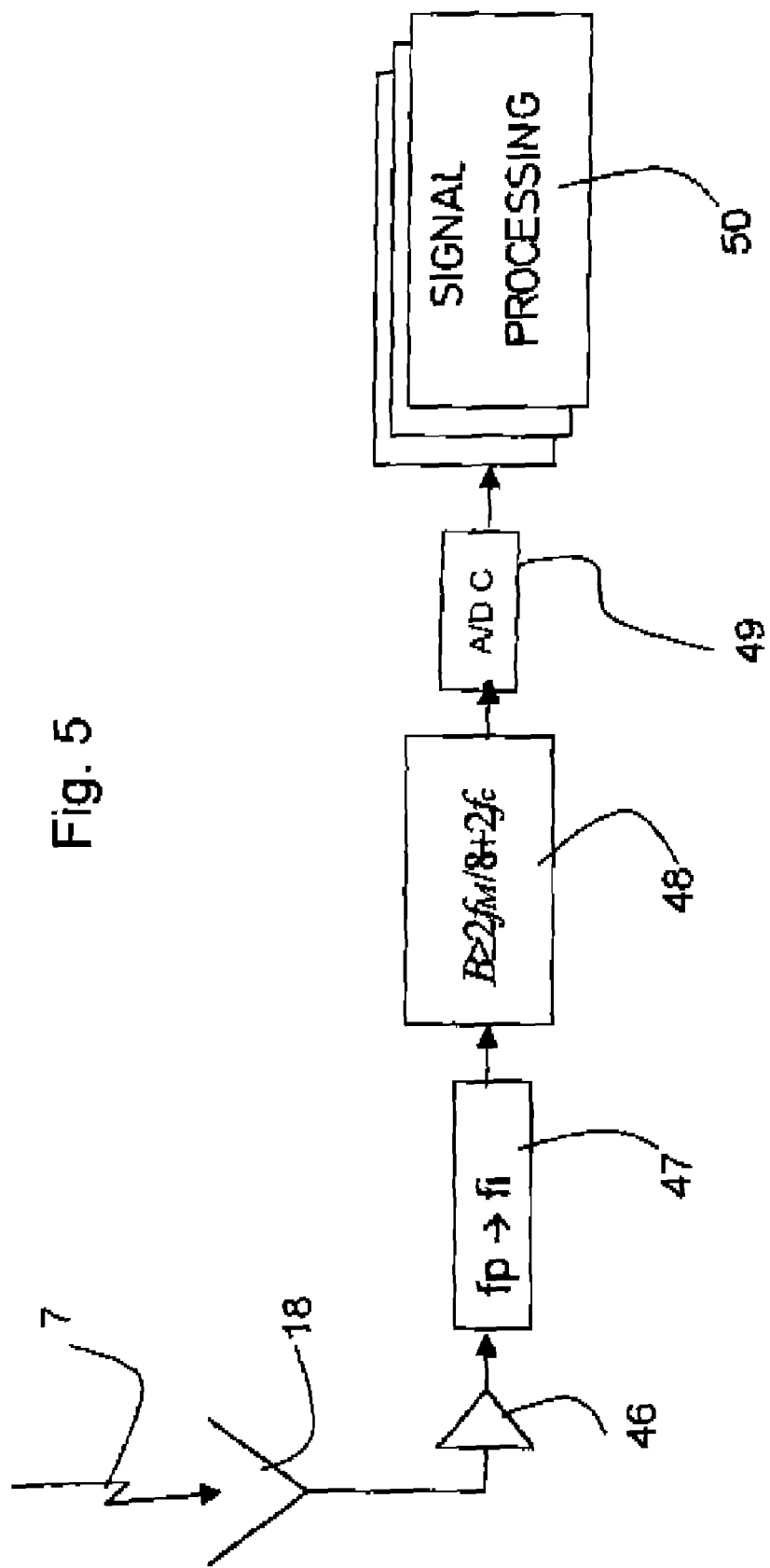
FIGS. 5 and 6 are diagrams representing two examples of possible architectures of receivers which are compatible with a method and a device according to the invention.
Figure 6:
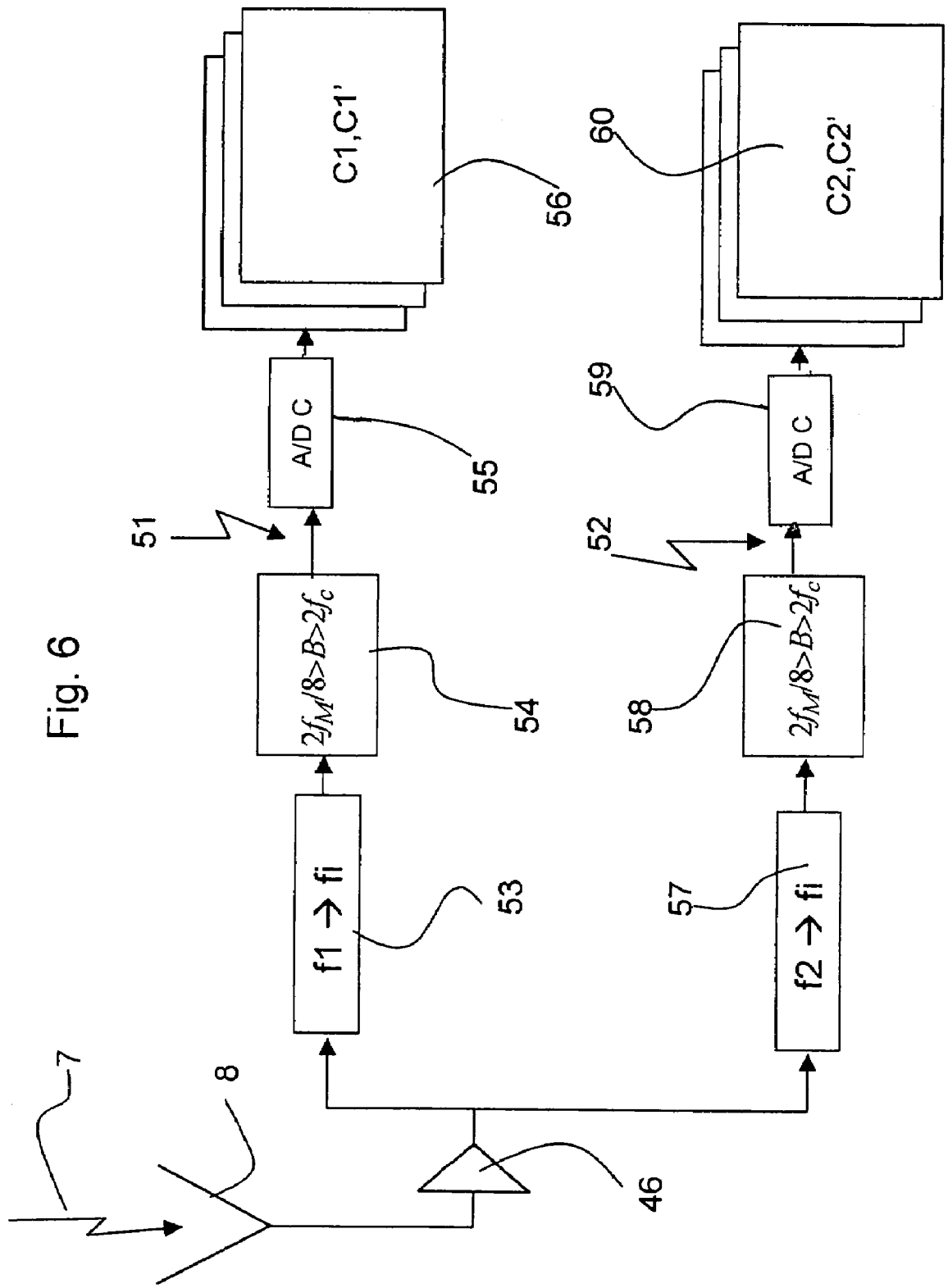

FIGS. 5 and 6 represent two implementation variants of an architecture for the receiver 6, for exploitation of the modulated navigation signal by the device according to the invention. In the variant of FIG. 5, a single branch is used for reception and processing of the navigation signal. Thus the radio frequency reception chain comprises the reception antenna 18, which is connected to a low noise amplifier 46, followed by a frequency conversion circuit 47, which converts the received signal from frequency fp to an intermediate frequency fi, which is suitable for the adapted receiver, to then make analog/digital conversion possible in the best possible conditions. The signal is then transmitted to a bandpass filter 48, which makes it possible to keep in the modulated navigation signal only the two main lobes corresponding to frequencies f1 and f2, eliminating the components outside these lobes. Thus the pass band of the bandpass filter 48 is greater than or equal to 2fM/8+2fc, and preferably of the order of this value, corresponding to the frequency spread of the two lobes of the navigation signal at frequencies f1 and f2. The thus filtered signal is supplied to an analog/digital converter 49, which supplies a corresponding digital signal to signal processing circuits 50, which together form one of the signal processing circuits 20 described above with reference to FIG. 3. The various circuits 50 each make it possible to process the various pseudorandom navigation codes C1, C2, C1', C2', jointly or otherwise. The number of circuits 50 depends on the use which is made of the receiver and of the services which are accessible to the user of this receiver. It is thus possible that the receiver is authorized to exploit only some of the codes, e.g. C1 and C1'.

In the variant of FIG. 6, the two frequencies f1 and f2 are processed separately on two distinct branches. Thus the output of the amplifier 46 feeds a first branch 51 and a second branch 52 in parallel. On the first branch 51, the lobe which is centered on the frequency f1 of the navigation signal is processed. This branch 51 thus comprises a circuit 53 to convert the frequency f1 to the intermediate frequency fi, followed by a bandpass filter 54 which makes it possible to keep only the lobe at frequency f1, the pass band of the filter 54 being between 2fM/8 and 2fc, an analog/digital converter 55, and multiple signal processing circuits 56 to extract the two navigation codes C1, C1'. Similarly, the branch 42 comprises a frequency conversion circuit 57 (from f2 to fi), followed by a bandpass filter 58 of pass band between 2fM/8 and 2fc, making it possible to extract the components at the lobe of frequency f2, an analog/digital converter 59, and signal processing circuits 60 to extract the codes C2, C2'.

Figure 9:
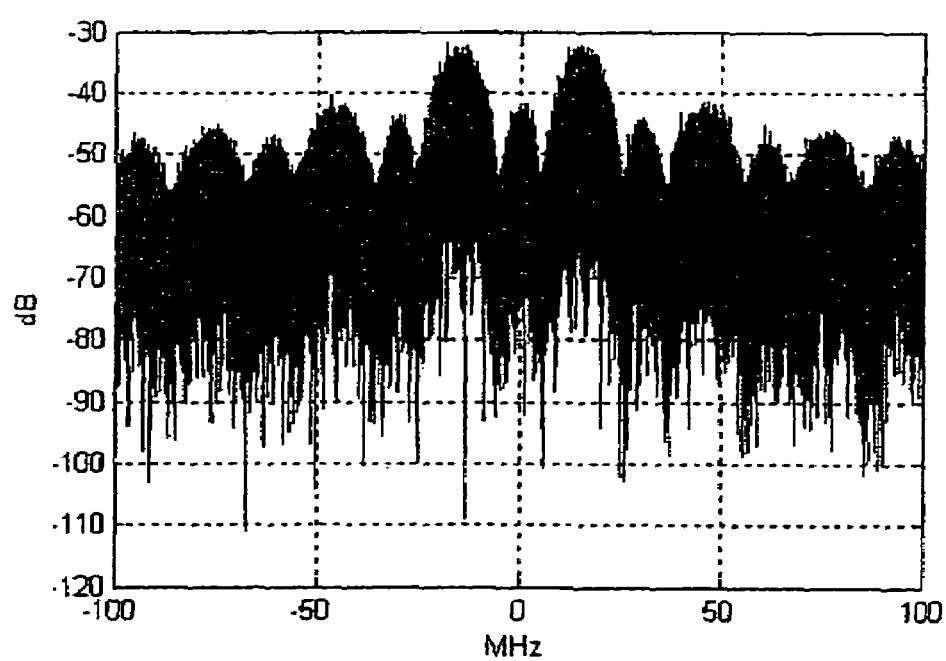
FIG. 9 is an example of a diagram representing a navigation signal spectrum of a method according to the invention.

FIG. 9 represents an example of a spectrum of a modulated navigation signal such as is transmitted by the payload (emitter). The central frequency is fp. As can be seen, this signal comprises two main lateral lobes, one at frequency f1, the other at frequency f2.

Figure 10:
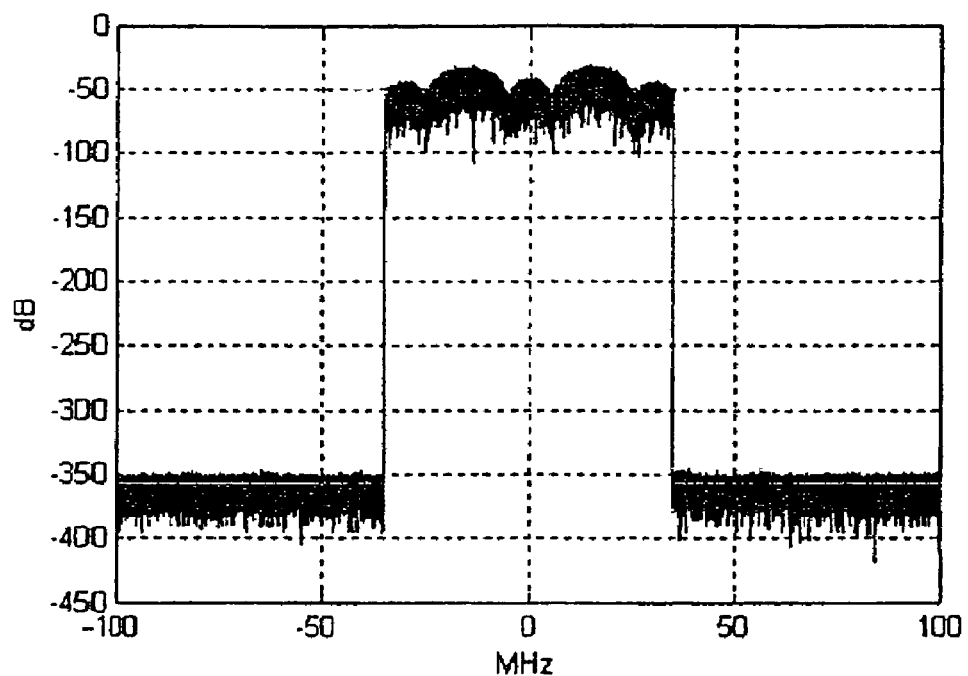
FIG. 10 is a diagram representing the spectrum of the signal of FIG. 9 filtered by a filter of central frequency fp and allowing the two main lobes at frequencies f1 and f2 and secondary lobes to pass.

FIG. 10 represents an example of a spectrum of a modulated navigation signal which is obtained after bandpass filtering by the filter 48 of FIG. 5 in a receiver. As can be seen, this signal comprises two main lateral lobes, one at frequency f1, the other at frequency f2.

Figure 11:
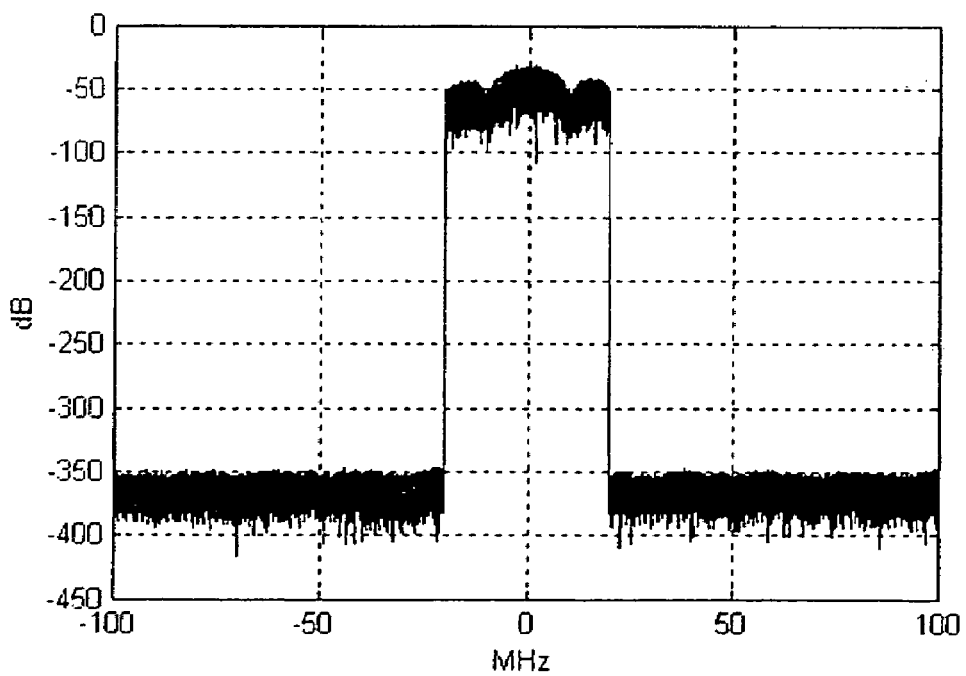
FIG. 11 is a diagram representing the spectrum of the signal of FIG. 9 filtered by a filter of central frequency f1 and allowing only the main lobe at f1 and parts of secondary lobes to pass.

FIG. 11 represents an example of a spectrum of a modulated navigation signal which is obtained after bandpass filtering by the filter 54 in a receiver of FIG. 6. Only the lobe which is centered by frequency f1 is present. This lobe contains the signals C1 and C1'.

Figure 12:
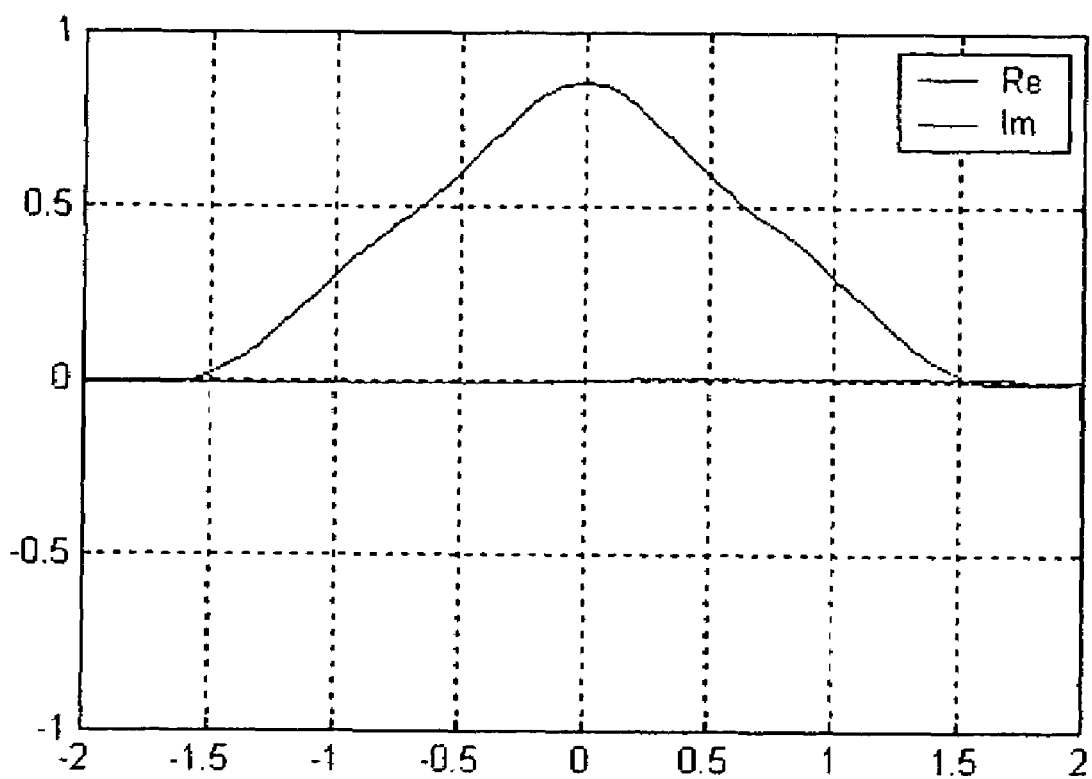
FIG. 12 is a diagram representing an example of a correlation function which is used in a receiver, and corresponding to the navigation signal of FIG. 11.

FIG. 12 is the correlation function of the signal, with the spectrum of FIG. 11 correlated with the replica of the codes C1 and C1', as generated by the receiver. The correlation peak (almost triangular shape) indicates the presence of the codes C1 and C1' in the signal of FIG. 11, and thus excellent correlation.

The results shown in FIGS. 11 and 12 were obtained by navigation signal simulation software, with a pass band of 40 MHz for the filter 53, a frequency f1 corresponding to band E5a, and a value of fM=120 MHz.

The navigation codes which are used are four pseudorandom codes of the type which is intended for the Galileo constellation.

The invention described above and shown in the figures can be the subject of numerous implementation variants.

In particular, the receiver architectures can be very different, and there are numerous known technologies in this matter. The various described functions can also be the subject of diverse structural implementations, which are well known per se.

Additionally, it is also possible to imagine using an 8-PSK modulation which is not symmetrical as shown and described above, but asymmetrical, the points P1 to P8 not being symmetrical to each other around the origin of the Fresnel plan.

Preferably, the value of fc is of the order of 10 MHz, and the value of fM is of the order of 120 MHz. Nevertheless, other values are possible and compatible with a navigation method and device according to the invention.

The invention claimed is:

1. A method of generating a modulated navigation signal (7) which is intended to be used to position a downlink receiver (6), comprising multiple pseudorandom navigation codes of chip rhythms greater than 0.5 MHz, modulated onto a carrier of frequency fp greater than 500 MHz, wherein four distinct and independent pseudorandom navigation codes C1, C2, C1', C2' are modulated onto the carrier according to an 8-PSK modulation of constant amplitude with a modulation frequency fM such that:

$$8fc \leq fM$$

where fc=Max(fci), and fci designates the chip rhythms fc1, fc1', fc2, fc2' of the navigation codes C1, C2, C1', C2', each fci value being such that fM=Ni.fci, Ni being an integer greater than or equal to 8, two navigation codes C1, C1' being quadrature modulated at frequency f1=fp−fM/8, and two other navigation codes C2, C2' being quadrature modulated at frequency f2=fp+fM/8, and the modulated navigation signal presenting a constant envelope,
wherein one of i) 8-PSK modulation of symmetrical constant amplitude in the Fresnel plan is used, and ii) 8-PSK modulation of asymmetrical constant amplitude in the Fresnel plan is used.

2. A method as claimed in claim 1, wherein fM is chosen to be $\leq 400$ MHz.

3. A method as claimed in claim 1, for generating a modulated navigation signal (7) on board a space satellite, wherein fM is chosen to be $\leq 200$ MHz.

4. A method as claimed in claim 1, wherein 8-PSK modulation of phase states equal to $k.\pi/4$, where k is an integer between 1 and 8, is used.

5. A method as claimed in claim 1, wherein the four codes are modulated according to a truth table which is chosen from the group of truth tables formed from:

TABLE 1

| C1 (t)  | −1 | −1 | −1 | −1 | −1 | −1 | −1 | −1 | 1  | 1  | 1  | 1  | 1  | 1  | 1  | 1  |
|---------|----|----|----|----|----|----|----|----|----|----|----|----|----|----|----|----|
| C2 (t)  | −1 | −1 | −1 | −1 | 1  | 1  | 1  | 1  | −1 | −1 | −1 | −1 | 1  | 1  | 1  | 1  |
| C1' (t) | −1 | −1 | 1  | 1  | −1 | −1 | 1  | 1  | −1 | −1 | 1  | 1  | −1 | −1 | 1  | 1  |
| C2' (t) | −1 | 1  | −1 | 1  | −1 | 1  | −1 | 1  | −1 | 1  | −1 | 1  | −1 | 1  | −1 | 1  |
|         |    |    |    |    |    | t modulo 8TM |    |    |    |    |    |    |    |    |    |    |
| [0, TM[     | P5 | P4 | P4 | P3 | P6 | P7 | P5 | P2 | P6 | P1 | P3 | P2 | P7 | P8 | P8 | P1 |
| [TM, 2TM[   | P5 | P8 | P4 | P3 | P6 | P7 | P5 | P6 | P2 | P1 | P3 | P2 | P7 | P8 | P4 | P1 |
| [2TM, 3TM[  | P1 | P8 | P4 | P7 | P6 | P7 | P5 | P6 | P2 | P1 | P3 | P2 | P3 | P8 | P4 | P5 |
| [3TM, 4TM[  | P1 | P8 | P8 | P7 | P2 | P7 | P5 | P6 | P2 | P1 | P3 | P6 | P3 | P4 | P4 | P5 |
| [4TM, 5TM[  | P1 | P8 | P8 | P7 | P2 | P3 | P1 | P6 | P2 | P5 | P7 | P6 | P3 | P4 | P4 | P5 |
| [5TM, 6TM[  | P1 | P4 | P8 | P7 | P2 | P3 | P1 | P2 | P6 | P5 | P7 | P6 | P3 | P4 | P8 | P5 |
| [6TM, 7TM[  | P5 | P4 | P8 | P3 | P2 | P3 | P1 | P2 | P6 | P5 | P7 | P6 | P7 | P4 | P8 | P1 |
| [7TM, 8TM[  | P5 | P4 | P4 | P3 | P6 | P3 | P1 | P2 | P6 | P5 | P7 | P2 | P7 | P8 | P8 | P1 |

TABLE 2

| C1 (t)  | −1 | −1 | −1 | −1 | −1 | −1 | −1 | −1 | 1  | 1  | 1  | 1  | 1  | 1  | 1  | 1  |
|---------|----|----|----|----|----|----|----|----|----|----|----|----|----|----|----|----|
| C2 (t)  | −1 | −1 | −1 | −1 | 1  | 1  | 1  | 1  | −1 | −1 | −1 | −1 | 1  | 1  | 1  | 1  |
| C1' (t) | −1 | −1 | 1  | 1  | −1 | −1 | 1  | 1  | −1 | −1 | 1  | 1  | −1 | −1 | 1  | 1  |
| C2' (t) | −1 | 1  | −1 | 1  | −1 | 1  | −1 | 1  | −1 | 1  | −1 | 1  | −1 | 1  | −1 | 1  |
|         |    |    |    |    |    | t modulo 8TM |    |    |    |    |    |    |    |    |    |    |
| [0, TM[     | P1 | P8 | P4 | P7 | P6 | P7 | P5 | P6 | P2 | P1 | P3 | P2 | P3 | P8 | P4 | P5 |
| [TM, 2TM[   | P1 | P8 | P8 | P7 | P2 | P7 | P5 | P6 | P2 | P1 | P3 | P6 | P3 | P4 | P4 | P5 |
| [2TM, 3TM[  | P1 | P8 | P8 | P7 | P2 | P3 | P1 | P6 | P2 | P5 | P7 | P6 | P3 | P4 | P4 | P5 |
| [3TM, 4TM[  | P1 | P4 | P8 | P7 | P2 | P3 | P1 | P2 | P6 | P5 | P7 | P6 | P3 | P4 | P8 | P5 |
| [4TM, 5TM[  | P5 | P4 | P8 | P3 | P2 | P3 | P1 | P2 | P6 | P5 | P7 | P6 | P7 | P4 | P8 | P1 |
| [5TM, 6TM[  | P5 | P4 | P4 | P3 | P6 | P3 | P1 | P2 | P6 | P5 | P7 | P2 | P7 | P8 | P8 | P1 |
| [6TM, 7TM[  | P5 | P4 | P4 | P3 | P6 | P7 | P5 | P2 | P6 | P1 | P3 | P2 | P7 | P8 | P8 | P1 |
| [7TM, 8TM[  | P5 | P8 | P4 | P3 | P6 | P7 | P5 | P6 | P2 | P1 | P3 | P2 | P7 | P8 | P4 | P1 | where P1, P2, P3, P4, P5, P6, P7, P8 are the various contacts and the 8-PSK constellation, and TM=1/fM, and other truth tables derived from these truth tables TABLE 1 and TABLE 2 by phase rotation by $n.\pi/4$, $n \in \{1,2,3,4,5,6,7\}$ and/or reversal of the direction of the path of the constellation.

6. A method as claimed in claim 1, wherein fp is between 1000 MHz and 1700 MHz.

7. A method as claimed in claim 1, wherein fc is of the order of 10 MHz.

8. A method as claimed in claim 1, wherein fM is of the order of 120 MHz.

9. A method of generating a modulated navigation signal (7) which is intended to be used to position a downlink receiver (6), comprising multiple pseudorandom navigation codes of chip rhythms greater than 0.5 MHz, modulated onto a carrier of frequency fp greater than 500 MHz, wherein four distinct and independent pseudorandom navigation codes C1, C2, C1', C2' are modulated onto the carrier according to an 8-PSK modulation of constant amplitude with a modulation frequency fM such that:

$$8fc \leq fM$$

where fc=Max(fci), and fci designates the chip rhythms fc1, Fc1', fc2, fc2' of the navigation codes C1, C2, C1', C2', each fci value being such that fM=Ni.fci, Ni being an integer greater than or equal to 8, two navigation codes C1, C1' being quadrature modulated at frequency f1=fp−fM/8, and two other navigation codes C2, C2' being quadrature modulated at frequency f2=fp+fM/8, and the modulated navigation signal presenting a constant envelope, wherein in at least one pair of codes C1, C1'; C2, C2' which are quadrature modulated onto the same frequency, one of said codes C1'; C2' incorporates digital data which is modulated according to a frequency less than fc/1000.

10. A device for generating a modulated navigation signal which is intended to be used to position a downlink receiver, comprising multiple pseudorandom navigation codes of chip rhythms greater than 0.5 MHz, modulated onto a carrier of frequency fp greater than 500 MHz, this device comprising:
a circuit to generate pseudorandom navigation codes,
a phase-shifting modulator circuit which supplies the modulated navigation signal on the carrier,
an emitter circuit, comprising at least one power amplification stage, and suitable for emitting a radio frequency signal corresponding to the modulated navigation signal, wherein the modulator circuit is suitable for modulating, on the carrier, four distinct and independent pseudorandom navigation codes C1, C2, C1', C2' of which the frequencies are an integer multiple of one of them fc, according to an 8-PSK modulation of constant amplitude with a modulation frequency fM such that:

8fc≦fM where fc=Max(fci), and fci designates the chip rhythms fc1, fc1', fc2, fc2' of the navigation codes C1, C2, C1', C2', each fci value being such that fM=Ni.fci, Ni being an integer greater than or equal to 8, two navigation codes C1, C1' being quadrature modulated at frequency f1=fp−fM/8, and two other navigation codes C2, C2' being quadrature modulated at frequency f2=fp+fM/8, and the modulated navigation signal presenting a constant envelope, wherein one of i) wherein the modulator circuit is suitable for implementing 8-PSK modulation of symmetrical constant amplitude in the Fresnel plan and 8-PSK modulation of symmetrical constant amplitude in the Fresnel plan is used, and ii) the modulator circuit is suitable for implementing 8-PSK modulation of asymmetrical constant amplitude in the Fresnel plan and 8-PSK modulation of asymmetrical constant amplitude in the Fresnel plan is used.

11. A device as claimed in claim 10, wherein the modulator circuit is suitable for implementing an 8-PSK modulation with a modulation frequency fM≦400 MHz.

12. A device as claimed in claim 10, wherein the modulator circuit is suitable for implementing an 8-PSK modulation with a modulation frequency fM≦200 MHz.

13. A device as claimed in claim 10, wherein the modulator circuit is suitable for implementing 8-PSK modulation of symmetrical constant amplitude in the Fresnel plan and the 8-PSK modulation of symmetrical constant amplitude in the Fresnel plan is used.

14. A device as claimed in claim 10, wherein the modulator circuit is suitable for implementing 8-PSK modulation of asymmetrical constant amplitude in the Fresnel plan and the 8-PSK modulation of asymmetrical constant amplitude in the Fresnel plan is used.

15. A device as claimed in claim 10, wherein the modulator circuit is suitable for implementing 8-PSK modulation of phase states equal to $k.\pi/4$, where k is an integer between 1 and 8.

16. A device as claimed in claim 10, wherein the modulator circuit is suitable for modulating the four codes according to a truth table which is chosen from the group of truth tables formed from:

TABLE 1

| C1 (t)  | −1 | −1 | −1 | −1 | −1 | −1 | −1 | −1 | 1  | 1  | 1  | 1  | 1  | 1  | 1  | 1  |
|---------|----|----|----|----|----|----|----|----|----|----|----|----|----|----|----|----|
| C2 (t)  | −1 | −1 | −1 | −1 | 1  | 1  | 1  | 1  | −1 | −1 | −1 | −1 | 1  | 1  | 1  | 1  |
| C1' (t) | −1 | −1 | 1  | 1  | −1 | −1 | 1  | 1  | −1 | −1 | 1  | 1  | −1 | −1 | 1  | 1  |
| C2' (t) | −1 | 1  | −1 | 1  | −1 | 1  | −1 | 1  | −1 | 1  | −1 | 1  | −1 | 1  | −1 | 1  | t modulo 8TM

| [0,TM[    | P5 | P4 | P4 | P3 | P6 | P7 | P5 | P2 | P6 | P1 | P3 | P2 | P7 | P8 | P8 | P1 |
| [TM, 2TM[ | P5 | P8 | P4 | P3 | P6 | P7 | P5 | P6 | P2 | P1 | P3 | P2 | P7 | P8 | P4 | P1 |
| [2TM, 3TM[| P1 | P8 | P4 | P7 | P6 | P7 | P5 | P6 | P2 | P1 | P3 | P2 | P3 | P8 | P4 | P5 |
| [3TM, 4TM[| P1 | P8 | P8 | P7 | P2 | P7 | P5 | P6 | P2 | P1 | P3 | P6 | P3 | P4 | P4 | P5 |
| [4TM, 5TM[| P1 | P8 | P8 | P7 | P2 | P3 | P1 | P6 | P2 | P5 | P7 | P6 | P3 | P4 | P4 | P5 |
| [5TM, 6TM[| P1 | P4 | P8 | P7 | P2 | P3 | P1 | P2 | P6 | P5 | P7 | P6 | P3 | P4 | P8 | P5 |
| [6TM, 7TM[| P5 | P4 | P8 | P3 | P2 | P3 | P1 | P2 | P6 | P5 | P7 | P6 | P7 | P4 | P8 | P1 |
| [7TM, 8TM[| P5 | P4 | P4 | P3 | P6 | P3 | P1 | P2 | P6 | P5 | P7 | P2 | P7 | P8 | P8 | P1 |

TABLE 2

| C1 (t)  | −1 | −1 | −1 | −1 | −1 | −1 | −1 | −1 | 1  | 1  | 1  | 1  | 1  | 1  | 1  | 1  |
|---------|----|----|----|----|----|----|----|----|----|----|----|----|----|----|----|----|
| C2 (t)  | −1 | −1 | −1 | −1 | 1  | 1  | 1  | 1  | −1 | −1 | −1 | −1 | 1  | 1  | 1  | 1  |
| C1' (t) | −1 | −1 | 1  | 1  | −1 | −1 | 1  | 1  | −1 | −1 | 1  | 1  | −1 | −1 | 1  | 1  |
| C2' (t) | −1 | 1  | −1 | 1  | −1 | 1  | −1 | 1  | −1 | 1  | −1 | 1  | −1 | 1  | −1 | 1  | t modulo 8TM

| [0, TM[   | P1 | P8 | P4 | P7 | P6 | P7 | P5 | P6 | P2 | P1 | P3 | P2 | P3 | P8 | P4 | P5 |
| [TM, 2TM[ | P1 | P8 | P8 | P7 | P2 | P7 | P5 | P6 | P2 | P1 | P3 | P6 | P3 | P4 | P4 | P5 |
| [2TM, 3TM[| P1 | P8 | P8 | P7 | P2 | P3 | P1 | P6 | P2 | P5 | P7 | P6 | P3 | P4 | P4 | P5 |
| [3TM, 4TM[| P1 | P4 | P8 | P7 | P2 | P3 | P1 | P2 | P6 | P5 | P7 | P6 | P3 | P4 | P8 | P5 |
| [4TM, 5TM[| P5 | P4 | P8 | P3 | P2 | P3 | P1 | P2 | P6 | P5 | P7 | P6 | P7 | P4 | P8 | P1 |
| [5TM, 6TM[| P5 | P4 | P4 | P3 | P6 | P3 | P1 | P2 | P6 | P5 | P7 | P2 | P7 | P8 | P8 | P1 |
| [6TM, 7TM[| P5 | P4 | P4 | P3 | P6 | P7 | P5 | P2 | P6 | P1 | P3 | P2 | P7 | P8 | P8 | P1 |
| [7TM, 8TM[| P5 | P8 | P4 | P3 | P6 | P7 | P5 | P6 | P2 | P1 | P3 | P2 | P7 | P8 | P4 | P1 | where P1, P2, P3, P4, P5, P6, P7, P8 are the various contacts and the 8-PSK constellation, and TM=1/fM, and other truth tables derived from these truth tables TABLE 1 and TABLE 2 by phase rotation by $n.\pi/4$, $n \in \{1,2,3,4,5,6,7\}$ and/or reversal of the direction of the path of the constellation.

17. A device as claimed in claim 10, wherein fp is between 1000 MHz and 1700 MHz.

18. A device as claimed in claim 10, wherein fc is of the order of 10 MHz.

19. A device as claimed in claim 10, wherein fM is of the order of 120 MHz.

20. A device as claimed in claim 10, which is adapted so that in at least one pair of codes which are quadrature modulated onto the same frequency, one of said codes C1', C2' incorporates digital data which is modulated according to a frequency less than fc/1000.

* * * * *